United States Patent
Chung et al.

(10) Patent No.: US 11,718,531 B2
(45) Date of Patent: Aug. 8, 2023

(54) METHOD FOR PRODUCING GRAPHENE QUANTUM DOTS

(71) Applicant: DXOME CO., LTD., Seongnam-si (KR)

(72) Inventors: Jun Hyuk Chung, Yongin-si (KR); Won Suk Jung, Gwangju-si (KR); Tae Young Kim, Seoul (KR)

(73) Assignee: DXOME CO., LTD., Seongnam-si (KR)

( * ) Notice: Subject to any disclaimer, the term of this patent is extended or adjusted under 35 U.S.C. 154(b) by 21 days.

(21) Appl. No.: 17/273,887

(22) PCT Filed: Sep. 7, 2018

(86) PCT No.: PCT/KR2018/010455
§ 371 (c)(1),
(2) Date: Mar. 5, 2021

(87) PCT Pub. No.: WO2020/050436
PCT Pub. Date: Mar. 12, 2020

(65) Prior Publication Data
US 2021/0316995 A1   Oct. 14, 2021

(51) Int. Cl.
*C01B 32/225* (2017.01)
*C09K 11/65* (2006.01)
(Continued)

(52) U.S. Cl.
CPC ............ *C01B 32/225* (2017.08); *C09K 11/65* (2013.01); *B82Y 20/00* (2013.01); *B82Y 40/00* (2013.01);
(Continued)

(58) Field of Classification Search
CPC .............. C01B 32/225; C01B 2204/32; C01B 2204/20; C01B 32/19; C01B 32/184;
(Continued)

(56) References Cited

U.S. PATENT DOCUMENTS

2013/0102084 A1* 4/2013 Loh ........................ B82Y 30/00
                                                             204/157.43
2015/0118143 A1   4/2015 Jeon et al.
(Continued)

FOREIGN PATENT DOCUMENTS

CN     105181660 A    12/2015
JP     2014001126 A    1/2014
(Continued)

OTHER PUBLICATIONS

Nguyen, et al., Graphene quantum dots produced by exfoliation of intercalated graphite nanoparticles and their application for temperature sensors, Applied Surface Science 2018; 427: 1152-1157 (Year: 2018).*

(Continued)

*Primary Examiner* — Daniel C. McCracken
(74) *Attorney, Agent, or Firm* — Hamre, Schumann, Mueller & Larson, P.C.

(57) ABSTRACT

The present disclosure provides a method of preparing graphene quantum dots by intercalation of graphite nanoparticles and continuous exfoliation in an aqueous solution. The preparation method has a short process time and uses graphite nanoparticles of several nm as a reactant. Thus, graphene quantum dots prepared by the preparation method are uniform in size and shape with minimized defects and improved electrical properties.

7 Claims, 6 Drawing Sheets

(51) Int. Cl.
B82Y 20/00 (2011.01)
B82Y 40/00 (2011.01)

(52) U.S. Cl.
CPC ...... *C01B 2204/32* (2013.01); *C01P 2004/04* (2013.01)

(58) Field of Classification Search
CPC ..... C01B 32/22; C01B 32/182; C01B 32/186; C01B 32/188; C01B 32/192; C01B 32/194; C01B 32/196; C01B 32/198; C01B 2204/00; C01B 2204/02; C01B 2204/04; C01B 2204/06; C01B 2204/065; C01B 2204/22; C01B 2204/24; C01B 2204/26; C01B 2204/28; C01B 2204/30; C01B 32/20; C01B 32/205; C01B 32/21; C01B 32/215; C01B 32/23; C09K 11/65; B82Y 20/00; B82Y 40/00; C01P 2004/04
See application file for complete search history.

(56) References Cited

U.S. PATENT DOCUMENTS

| | | | |
|---|---|---|---|
| 2017/0233255 A1 | | 8/2017 | Zhamu et al. |
| 2019/0093239 A1* | | 3/2019 | Shinde ................ C01B 21/064 |

FOREIGN PATENT DOCUMENTS

| | | | | |
|---|---|---|---|---|
| KR | 101282741 B1 | | 7/2013 | |
| KR | 10-2015-0047326 | * | 5/2015 | ............ C09K 11/55 |
| KR | 1020150047326 A | | 5/2015 | |
| KR | 10-2016-0002009 | * | 1/2016 | ............ C01B 32/19 |
| KR | 1020160002009 A | | 1/2016 | |
| KR | 1020160025339 A | | 3/2016 | |
| KR | 10-2016-0069109 A | | 6/2016 | |
| WO | 2011/162727 A1 | | 12/2011 | |
| WO | WO 2011/162727 | * | 12/2011 | ............ C01B 31/04 |
| WO | 2017/161406 A1 | | 9/2017 | |
| WO | WO 2017/161406 | * | 9/2017 | ............ C01B 31/04 |

OTHER PUBLICATIONS

Song, et al., Highely Efficient Light-Emitting Diode of Graphene Quantum Dots Fabricated from Graphite Intercalation Compounds, Adv. Optical Mater. 2014; 2: 1016-1023 (Year: 2014).*
Zhang, et al., Solution-Processed Graphene Quantum Dot Deep-UV Photodetectors, ACS Nano 2015; 9(2): 1561-1570 (Year: 2015).*
Yoon, et al., Intrinsic Photoluminescence Emission from Subdomained Graphene Quantum Dots, Adv. Mater. 2016; 28: 5255-5261 (Year: 2016).*
Nguyen et al., "Graphene quantum dots produced by exfoliation of intercalated graphite nanoparticles and their application for temperature sensors", Applied Surface Science, vol. 427, Part B, Jan. 1, 2018, pp. 1152-1157.
Extended European Search Report; European Patent Application No. 18932509.5, dated Feb. 15, 2022 (8 pages).
International Search Report (with English) issued in PCT/KR2018/010455, dated May 29, 2019.
Nguyen, et al., Graphene quantum dots produced by exfoliation of intercalated graphite nanoparticles and their application for temperature sensors, Applied Surface Science, vol. 427, 2018, pp. 1152-1157.

* cited by examiner

METHOD FOR PRODUCING GRAPHENE QUANTUM DOTS

TECHNICAL FIELD

The present disclosure relates to a method of preparing graphene quantum dots and provides a preparation method capable of mass-producing high-quality graphene quantum dots which are substantially free of impurities.

BACKGROUND

Graphene quantum dots (GQDs) generally refer to one or more layers of graphene having a lateral size of less than 20 nm. GQDs where electron transport is confined in all three spatial dimensions exhibit size-, shape- and edge-dependent electrical properties.

Conventionally, graphene itself does not have a band gap and thus does not exhibit semiconductor properties, which limits its application in the field of electronic devices. Examples of known methods of introducing a band gap to graphene include dopant doping, coupling induction in graphene and quantum confinement effect represented by GQDs. GQDs are materials fabricated in the form of dots with a size of 20 nm or less to impart semiconductor properties to graphene which is a conductive material. If GQDs have a particle size of several tens nm or less, electrons are trapped by walls, and, thus, a conductive material specifically possesses semiconductor properties. GQDs are receiving a lot of attention from various energy and display fields due to their photoluminescence, high transparency and surface area.

GQDs may be prepared by chemical vapor deposition (CVD), solution chemical method, hydrothermal route, micro fluidization, electrochemical method and the like.

One of the conventional methods of preparing GQDs relates to a process of oxidizing graphite into graphene oxide and then reducing graphene oxide into graphene, but this process requires strongly acidic conditions to synthesize graphene oxide and takes a long process time due to complicated reaction processes. Also, this process has a relatively low yield of GQDs compared to the long process time, and causes environmental problems by using an oxidizing agent, a strong acid and a reducing agent. Also, since graphene oxide is reduced, the prepared GQDs are in a state in which pure carbon bonds are not present but carbon bonds and oxygen bonds are mixed, which results in a low purity of GQDs.

As one of prior arts, Korean Patent Laid-open Publication No. 10-2015-0047326 discloses a method of fabricating high-quality graphene quantum dots by preparing an intercalation compound of graphite from graphite and alkaline metallic hydrate salts and exfoliating graphite. Natural graphite flakes having a size of several μm to several tens μm are used as a reactant, which results in a low production efficiency of the intercalation compound of graphite and non-uniformity in the size of the graphene quantum dots.

PRIOR ART DOCUMENT

Korean Patent Laid-open Publication No. 10-2015-0047326

DISCLOSURE OF THE INVENTION

Problems to be Solved by the Invention

The present disclosure provides a method of preparing graphene quantum dots by intercalation of graphite nanoparticles and continuous exfoliation in an aqueous solution. The preparation method has a short process time and uses graphite nanoparticles of several nm as a reactant. Thus, graphene quantum dots prepared by the preparation method are uniform in size and shape with minimized defects and improved electrical properties.

Further, in the present disclosure, an intercalation composite is formed by inserting a dopant into graphite nanoparticles and then, graphene quantum dots are exfoliated from the intercalation composite on a foil-shaped substrate by means of electrochemical exfoliation (for example, applying a voltage), and, thus, the production yield of high-quality graphene quantum dots can be improved.

However, the problems to be solved by the present disclosure are not limited to the above-described problems. Although not described herein, other problems to be solved by the present disclosure can be clearly understood by a person with ordinary skill in the art from the following descriptions.

Means for Solving the Problems

A first aspect of the present disclosure provides a method of preparing graphene quantum dots, including: a process of introducing a carbon-based layered structure into a reactor containing a solvent; a process of forming an intercalation composite by inserting an intercalant between layers of the carbon-based layered structure; a process of placing and heat-treating the intercalation composite on a substrate to weaken the interlayer attractive force of the intercalation composite; and a process of exfoliating the intercalation composite by applying a voltage to the substrate to obtain graphene quantum dots.

A second aspect of the present disclosure provides graphene quantum dots prepared by the preparation method according to the first aspect of the present disclosure.

Effects of the Invention

The method of preparing graphene quantum dots according to the embodiments of the present disclosure is environmentally friendly because the solution process using a solvent does not use harmful chemical solvents or surfactants compared to the prior art. Also, the preparation method is simple, which results in a reduction of process cost. Therefore, it is cost effective and capable of mass-producing high-quality graphene quantum dots.

The graphene quantum dots prepared by the method of preparing graphene quantum dots according to the embodiments of the present disclosure are uniform in size and shape with minimized defects and improved electrical properties.

BEST MODE FOR CARRYING OUT THE INVENTION

Figure 1:
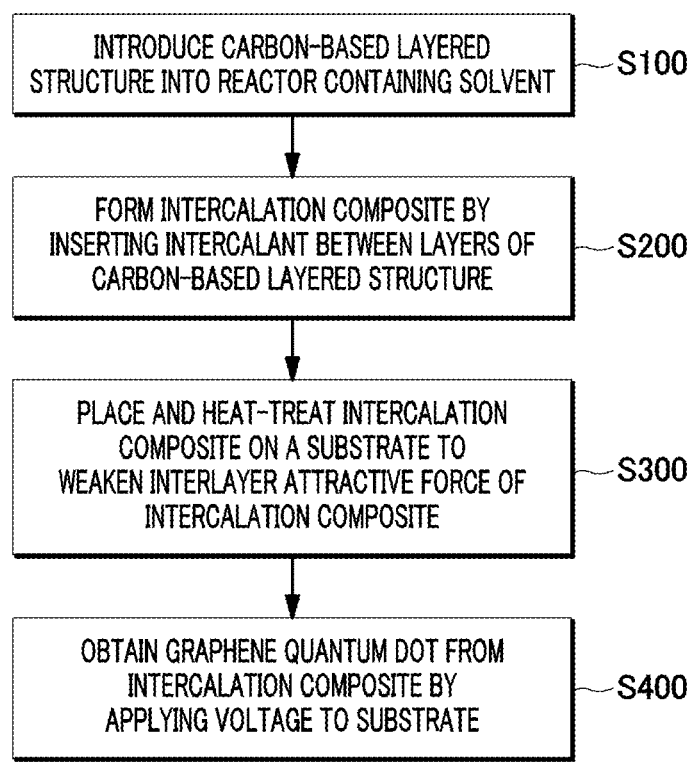
FIG. 1 is a flowchart illustrating a method of preparing graphene quantum dots in accordance with an embodiment of the present disclosure.

Hereinafter, embodiments of the present disclosure will be described in detail with reference to the accompanying drawings so that the present disclosure may be readily implemented by a person with ordinary skill in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the other element and a case that any other element exists between these two elements.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for".

Through the whole document, the term "combination(s) of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Hereinafter, embodiments and examples of the present disclosure will be described in detail with reference to the accompanying drawings. However, the present disclosure may not be limited to the following embodiments, examples, and drawings.

A first aspect of the present disclosure provides a method of preparing graphene quantum dots, including: a process of introducing a carbon-based layered structure into a reactor containing a solvent; a process of forming an intercalation composite by inserting an intercalant between layers of the carbon-based layered structure; a process of placing and heat-treating the intercalation composite on a substrate to weaken the interlayer attractive force of the intercalation composite; and a process of exfoliating the intercalation composite by applying a voltage to the substrate to obtain graphene quantum dots.

FIG. 1 is a flowchart illustrating a method of preparing graphene quantum dots in accordance with an embodiment of the present disclosure.

In FIG. 1, a process S100 includes introducing a carbon-based layered structure 100 into a reactor containing a solvent. A process S200 includes forming an intercalation composite 200 by inserting an intercalant 110 between layers of the carbon-based layered structure 100. A process sS300 includes placing and heat-treating the intercalation composite 200 on a substrate to weaken the interlayer attractive force of the intercalation composite 200. A process S400 includes exfoliating the intercalation composite 200 by applying a voltage to the substrate to obtain graphene quantum dots 300. As shown in FIG. 1, the processes S100 to S400 may be performed sequentially.

In an embodiment of the present disclosure, the solvent may include NMP (N-methyl-2-pyrrolidinone), DMF (N,N-dimethylformamide) or diacetone alcohol, but may not be limited thereto.

In an embodiment of the present disclosure, the carbon-based layered structure 100 may include graphite nanoparticles, graphene nanoparticles or graphene oxide nanoparticles, but may not be limited thereto.

In an embodiment of the present disclosure, the graphite nanoparticles, graphene nanoparticles or graphene oxide nanoparticles may have a size of from about 1 nm to about 20 nm. For example, the graphite nanoparticles, graphene nanoparticles or graphene oxide nanoparticles may have a size of from about 1 nm to about 20 nm, from about 1 nm to about 15 nm, from about 1 nm to about 10 nm, from about 1 nm to about 8 nm, from about 1 nm to about 5 nm, from about 1 nm to about 4 nm, from about 1 nm to about 3 nm, from about 1 nm to about 2 nm, from about 2 nm to about 20 nm, from about 2 nm to about 15 nm, from about 2 nm to about 10 nm, from about 2 nm to about 8 nm, from about 2 nm to about 5 nm, from about 2 nm to about 4 nm, from about 2 nm to about 3 nm, from about 3 nm to about 20 nm, from about 3 nm to about 15 nm, from about 3 nm to about 10 nm, from about 3 nm to about 8 nm, from about 3 nm to about 5 nm, from about 3 nm to about 4 nm, from about 4 nm to about 20 nm, from about 4 nm to about 15 nm, from about 4 nm to about 10 nm, from about 4 nm to about 8 nm, from about 4 nm to about 5 nm, from about 5 nm to about 20 nm, from about 5 nm to about 15 nm, from about 5 nm to about 10 nm, from about 5 nm to about 8 nm, from about 8 nm to about 20 nm, from about 8 nm to about 15 nm, from about 8 nm to about 10 nm, from about 10 nm to about 20 nm, from about 10 nm to about 15 nm or from about 15 nm to about 20 nm, but may not be limited thereto. Since the graphite nanoparticles, graphene nanoparticles or graphene oxide nanoparticles have a size as described above, it is possible to improve the quality or production yield of graphene quantum dots prepared by suitably inserting the intercalant 110 inserted between layers the intercalation composite 200.

In an embodiment of the present disclosure, the intercalant 110 may include an alkali metal salt or an alkaline earth metal salt. The intercalant 110 may include cations of alkali metal and alkaline earth metal or anions of sulfuric acid and phosphoric acid, but may not be limited thereto. For example, the intercalant 110 may be potassium sodium tartrate hydrate ($KNaC_4H_4O_6 4H_2O$) and may use inorganic salts, such as sulfuric acid ($H_2SO_4$), phosphoric acid ($H_3PO_4$), ammonium sulfate (($NH_4$)$_2SO_4$), sodium sulfate ($Na_2SO_4$) and potassium sulfate ($K_2SO_4$), purchased from Aldrich, but is not particularly limited in kind.

In an embodiment of the present disclosure, the alkali metal may be, for example, Li, Na, K or the like, and the alkaline earth metal may be, for example, Be, Mg, Ca or the like, but may not be limited thereto.

Figure 2:
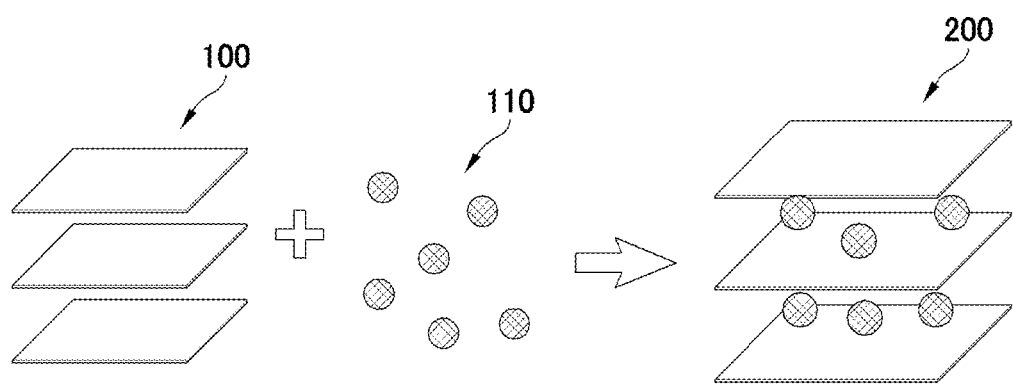
FIG. 2 is a schematic diagram illustrating a process S200 in the method of preparing graphene quantum dots in accordance with an embodiment of the present disclosure.

FIG. 2 is a schematic diagram illustrating the process S200 in the method of preparing graphene quantum dots in accordance with an embodiment of the present disclosure.

The process S200 may include forming the intercalation composite 200 by inserting the intercalant 110 between layers of the carbon-based layered structure 100.

Referring to FIG. 2, if the carbon-based layered structure 100 is introduced into the reactor and then, the intercalant 110 is added thereto, the intercalant 110 may be diffused and inserted between layers of the carbon-based layered structure 100. As a result, the intercalation composite 200 can be formed.

The carbon-based layered structure 100 may be, for example, graphite nanoparticles, and the graphite nanoparticles may have a layered structure.

The intercalation composite 200 may contain, for example, potassium sodium tartrate hydrate ($KNaC_4H_4O_6 4H_2O$) as the intercalant 110 between layers of graphite nanoparticles and may be internally subjected to the attractive force the carbon-based layered structure 100 and the intercalant 110.

In an embodiment of the present disclosure, if the intercalant 110 includes the alkali metal or the alkaline earth metal and is inserted into the carbon-based layered structure 100, the interlayer attractive force of the carbon-based layered structure 100 may be decreased and each layer of the layered structure may be easily separated from each other, but may not be limited thereto.

In an embodiment of the present disclosure, alkali metal ions or alkaline earth metal ions can be obtained from an alkali metal salt containing alkali metal (Li, Na, K, Rb, Cs) as cations or an alkaline earth metal salt containing alkaline earth metal (Be, Mg, Ca, Sr, Ba) as cations by two methods.

In an embodiment of the present disclosure, one of the methods for obtaining alkali metal ions or alkaline earth metal ions from an alkali metal salt or an alkaline earth metal salt is to heat the alkali metal salt or the alkaline earth metal salt together to a melting point or more. Here, when two or more salts are added together, the melting point is lowered at a specific mixing molar ratio of the two or more salts. The molar ratio and temperature at that time are called a eutectic point which can be seen on a phase diagram of the two or more salts.

The other method for obtaining alkali metal ions or alkaline earth metal ions from an alkali metal salt or an alkaline earth metal salt is to dissolve the salt by adding a solvent. Unlike the first method, it is not necessary to increase the process temperature to the melting point of the salt, and, thus, the process temperature can be further reduced.

Desirably, a salt mixture containing two or more salts is used in order to obtain alkali metal ions or alkaline earth metal ions from an alkali metal salt or an alkaline earth metal salt. Here, salts, such as like KI and KCl, having the same cations and different anions may be used, or salts, such as KI and LiI, having different cations and the same anions may be used. In addition, salts, such as KI and LiCl, having different anions and different cations may be used. That is, any kind of slat can be used as long as it is a salt containing alkali metal or alkaline earth metal as cations.

In an embodiment of the present disclosure, a salt mixture comprising two or more alkali metal salts or alkaline earth metal salts can be produced into a mixture by mixing with graphite. Further, the salt mixture may be melted by heating the mixture to a eutectic point or more of the salt mixture or the salt mixture may be dissolved by adding a solvent to the mixture.

In an embodiment of the present disclosure, a graphite intercalation compound, i.e., the intercalation composite 200 may be formed using cations of alkali metal and alkaline earth metal or anions of sulfuric acid and phosphoric acid.

In an embodiment of the present disclosure, the substrate may include aluminum foil, copper foil or graphite foil, but may not be limited thereto.

In an embodiment of the present disclosure, the preparation method may further include a process of performing ultrasonication on the composite 200, but may not be limited thereto. If the preparation method of the present disclosure further includes the process of performing ultrasonication on the composite, the intercalation composite 200 can be easily and flawlessly exfoliated by ultrasonic waves, and, thus, the production yield of the graphene quantum dot 300 can be improved.

The process of forming the intercalation composite 200 by inserting the intercalant 110 between layers of the carbon-based layered structure 100 may include a process of introducing the carbon-based layered structure 100 and the intercalant 110 into the reactor containing the solvent and mixing the carbon-based layered structure 100 and the intercalant 110. By the process of introducing and mixing the carbon-based layered structure 100 and the intercalant 110, the intercalant 110 can be placed between layers of the carbon-based layered structure 100 and the interlayer attractive force can be weakened to exfoliate the intercalation composite 200, but may not be limited thereto.

The intercalation complex 200 containing alkali metal or alkaline earth metal may be spontaneously formed when cations of alkali metal and alkaline earth metal or anions of sulfuric acid and phosphoric acid are diffused and inserted between layers of the carbon-based layered structure. The diffusion distance of the cations of alkali metal and alkaline earth metal or the anions of sulfuric acid and phosphoric acid can be calculated from the diffusivity. Accordingly, it is possible to predict the average size of products.

In an embodiment of the present disclosure, when the intercalation composite 200 is formed using an intercalant (including alkali metal or alkaline earth metal), the intercalant (including alkali metal or alkaline earth metal) can be diffused and inserted between layers of graphite nanoparticles.

Figure 3:
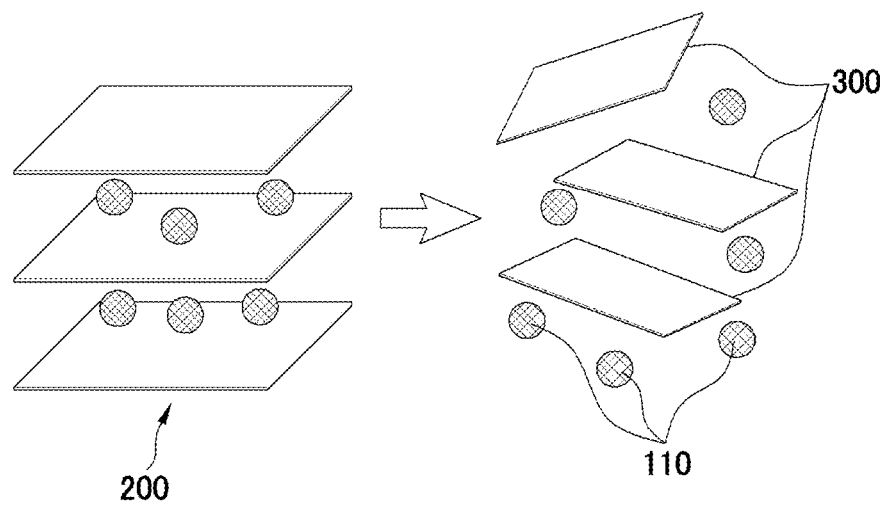
FIG. 3 is a schematic diagram illustrating processes S300 and S400 in the method of preparing graphene quantum dots in accordance with an embodiment of the present disclosure.

FIG. 3 is a schematic diagram illustrating graphene quantum dots obtained by the processes S300 and S400 in the method of preparing graphene quantum dots in accordance with an embodiment of the present disclosure.

Referring to FIG. 3, the intercalation composite 200 obtained in the process S200 may be heat-treated and applied with a voltage through the processes S300 and S400, and, thus, the graphene quantum dots 300 can be easily exfoliated and obtained from the intercalation composite 200. Also, the intercalation composite 200 may be placed on the substrate and applied with a voltage, and, thus, the graphene quantum dots 300 and the intercalant 110 can be separated.

In the process of placing and heat-treating the intercalation composite 200 on the substrate to weaken the interlayer attractive force of the intercalation composite 200, the heat treatment may be performed at a temperature of from about 100° C. to about 300° C. For example, the heat treatment may be performed at a temperature in the range of from about 100° C. to about 300° C., from about 100° C. to about 250° C., from about 100° C. to about 200° C., from about 100° C. to about 150° C., from about 150° C. to about 300° C., from about 150° C. to about 250° C., from about 150° C. to about 200° C., from about 200° C. to about 300° C., from about 200° C. to about 250° C., or from about 250° C. to about 300° C. Since the heat treatment is performed in the above-described temperature range, the intercalant 110 inside the prepared intercalation composite 200 facilitates weakening of the interlayer attractive force of the carbon-based layered structure 100, which results in easier separation of layers.

In the process of obtaining the graphene quantum dots 300 from the intercalation composite 200 by applying a voltage to the substrate, the voltage applied to the substrate may be from about −0.1 V to about −5 V, but may not be limited thereto. For example, the voltage may be from about −0.1 V to about −5 V, from about −0.1 V to about −3 V, from about −0.1 V to about −2 V, from about −0.1 V to about −1 V, from about −1 V to about −5 V, from about −1 V to about −3 V, from about −1 V to about −2 V, from about −2 V to about −5 V, from about −2 V to about −3 V, or from about −3 V to about −5 V. Due to the applied voltage, the graphene quantum dots 300 may be exfoliated and obtained in uniform size from the intercalation composite 200 placed on the substrate, but may not be limited thereto.

In an embodiment of the present disclosure, the carbon-based layered structure 100 and the intercalant 110 may have a weight ratio of about 10:90, but may not be limited thereto.

In an embodiment of the present disclosure, the carbon-based layered structure 100 and the intercalant 110 may have a weight ratio of, for example, about 5:95, about 10:90, about 20:80, about 30:70, about 40:60 or about 50:50, but may not be limited thereto. Since the carbon-based layered structure 100 and the intercalant 110 has a weight ratio as described above, when an intercalant is inserted between layers of the carbon-based layered structure, the interlayer attractive force is adjusted to a desired level. Therefore, exfoliation of the carbon-based layered structure may occur more actively, but may not be limited thereto.

A second aspect of the present disclosure provides graphene quantum dots prepared by the preparation method according to the first aspect of the present disclosure.

All the descriptions of the first aspect of the present disclosure can be applied to the second aspect of the present disclosure, and the omission of the descriptions in the second aspect of the present disclosure does not mean to exclude the application of the descriptions to the second aspect of the present disclosure.

In an embodiment of the present disclosure, the graphene quantum dots according to the second aspect of the present disclosure is prepared by the preparation method according to the first aspect of the present disclosure. Since the solution process adopted here does not use surfactants and/or chemical solvents, defects may be minimized in the graphene quantum dots. Also, the graphene quantum dots may show blue light emission under ultraviolet rays (365 nm) and may be uniform in size and shape, but may not be limited thereto.

MODE FOR CARRYING OUT THE INVENTION

Example

1. Preparation Method of Graphene Quantum Dots

Graphite nanoparticles (SkySpring Nanomaterials, USA) having a diameter of from about 3 nm to about 4 nm were prepared to produce graphene quantum dots. The graphite nanoparticles were mixed with potassium sodium tartrate hydrate ($KNaC_4H_4O_6 4H_2O$, Aldrich) at a weight ratio of 10:90 by induction. Then, the mixture was put into a Teflon-lined autoclave and treated at a temperature of 250° C. for 10 hours to prepare a graphite intercalation compound 200 in which the potassium sodium tartrate hydrate is inserted between layers of the graphite nanoparticles. The prepared graphite intercalation compound 200 was placed on aluminum foil and applied with a voltage to exfoliate each layer of graphite. As a result, graphene quantum dots 300 having a diameter of from about 3 nm to about 4 nm were prepared. The prepared graphene quantum dots were obtained by centrifugation at 13,000 rpm for 30 minutes.

After the supernatant was removed, the graphene quantum dots were redispersed in purified water, and dialyzed for 5 days using a cellulose dialysis membrane (MWCO 6000-8000 Da) to remove any remaining salt. The graphene quantum dot aqueous solution was ultra-filtrated using a syringe filter (Whatman, Anotop, Sigma-Aldrich) having a pore size of 20 nm. The yield of the synthesized graphene quantum dots was measured by fluorescence analysis.

2. Characterization

Figure 4:
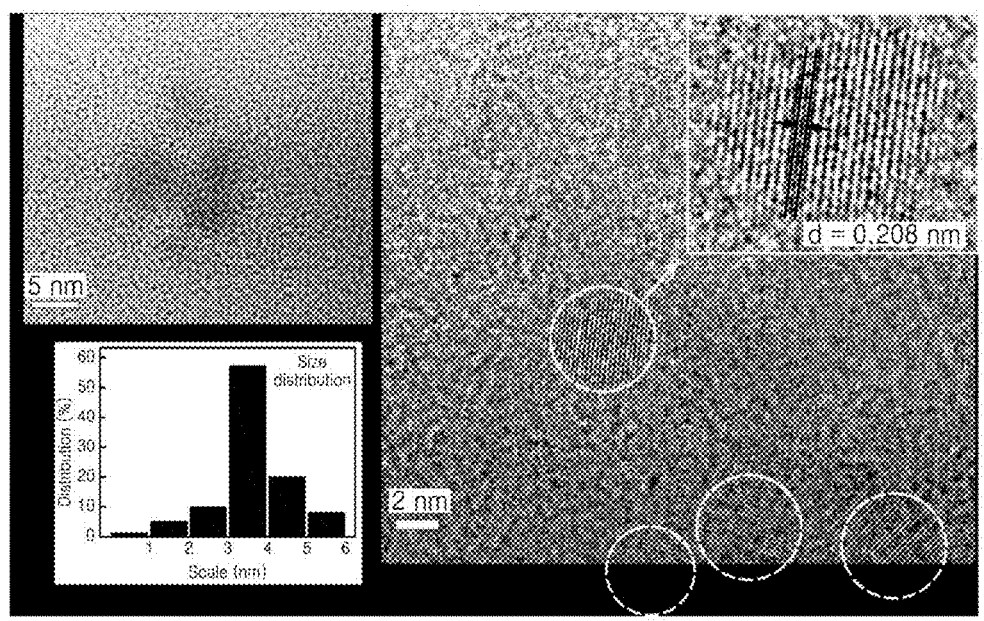
FIG. 4 shows HRTEM images and a size distribution graph for graphene quantum dots prepared by the method of preparing graphene quantum dots of the present disclosure, in accordance with an example of the present disclosure.

FIG. 4 shows HRTEM images and a size distribution graph for graphene quantum dots prepared by the method of preparing graphene quantum dots of the present disclosure, in accordance with an example of the present disclosure. An HRTEM (High Resolution TEM) image refers to a high magnification image obtained by enlarging a TEM (Transmission Electron Microscopy) image.

The graphene quantum dots had a dimeter of from about 2 nm to about 5 nm and had an average diameter of about 3.5 nm with a narrow size distribution. These graphene quantum dots showed a uniform crystal structure with an inter-lattice distance of about 0.21 nm, which coincides with a hexagonal lattice plane of graphene with $d_{1100}$.

Figure 5:
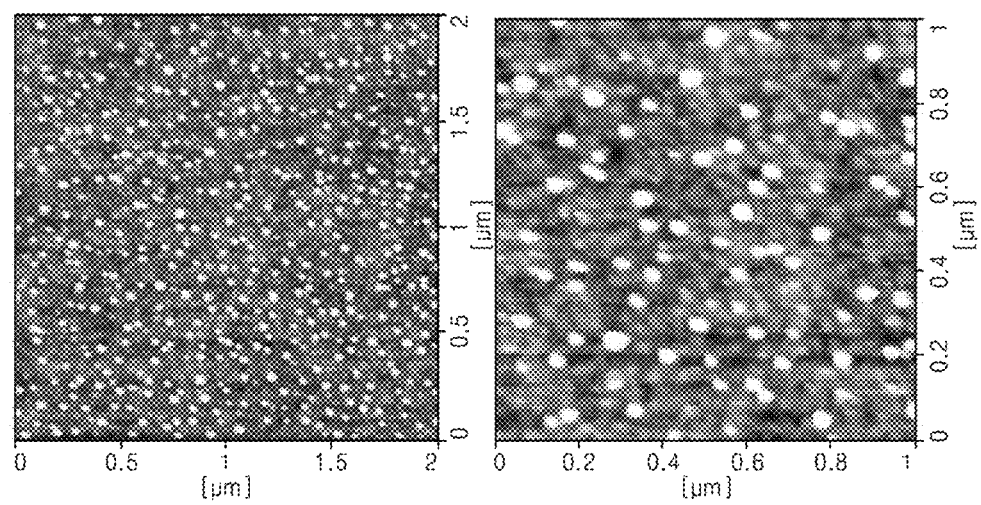
FIG. 5 shows AFM images for graphene quantum dots prepared by the method of preparing graphene quantum dots of the present disclosure, in accordance with an example of the present disclosure.

FIG. 5 shows AFM images for graphene quantum dots prepared by the method of preparing graphene quantum dots of the present disclosure, in accordance with an example of the present disclosure.

The AFM images of FIG. 5 show the topographical schematic diagram and the thickness distribution of graphene quantum dots. They show that the average thickness of the prepared graphene quantum dots is about 1.09 nm and the thickness distribution is in the range of from about 0.5 nm to about 1.5 nm. Considering that the distance between successive graphene layers is 0.34 nm, the AFM results confirm that the prepared graphene quantum dots are formed into from about 1 layer to about 3 layers.

Figure 6:
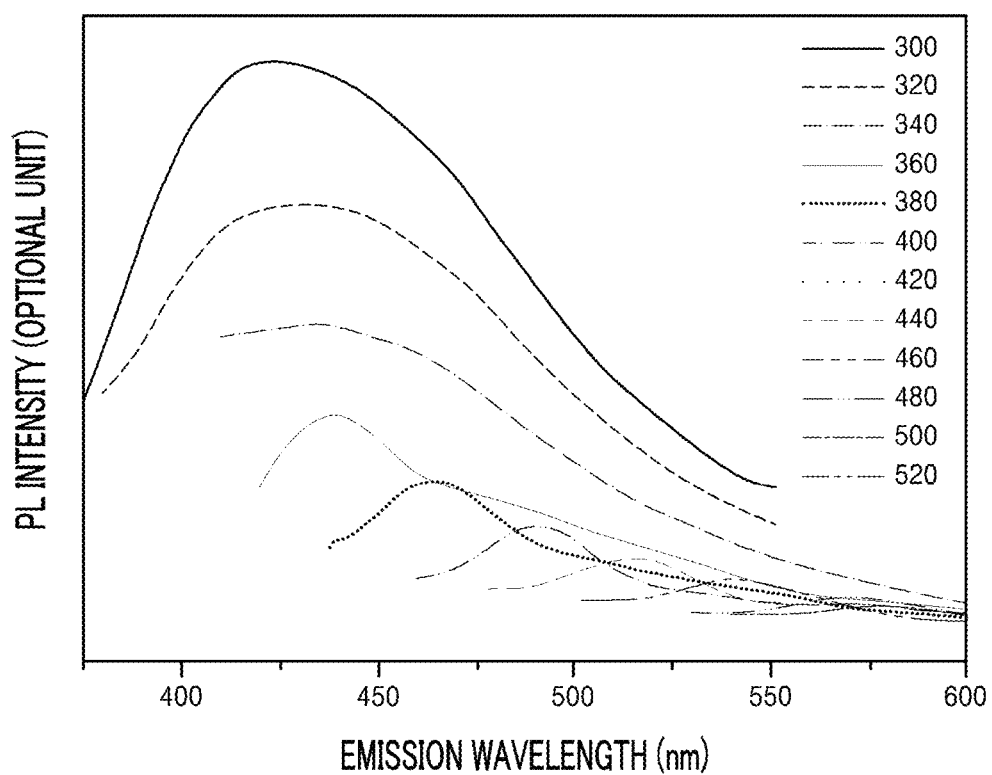
FIG. 6 shows PL spectra of graphene quantum dots prepared by the method of preparing graphene quantum dots of the present disclosure, in accordance with an example of the present disclosure.

FIG. 6 shows PL spectra of graphene quantum dots prepared by the method of preparing graphene quantum dots of the present disclosure, in accordance with an example of the present disclosure.

The dispersion degree of the synthesized graphene quantum dots appeared light brown under daylight and showed light blue fluorescence (PL) under ultraviolet rays (365 nm). Similar to graphene quantum dots produced by other preparation methods, the graphene quantum dots produced by the preparation method of the present disclosure efficiently absorbed ultraviolet rays. It is known that the d-d* transition in the $sp^2$ domains of aromatic compound absorbs strong ultraviolet rays of 300 nm or less. The UV absorption spectrum of the prepared graphene quantum dots showed two absorption bands at about 250 nm and about 360 nm which represent σ-d and d-d* transitions, respectively, in a triple bonding state such as carbine at the zig-zag edge of the graphene quantum dots. A graphene quantum dot suspension exhibited different PL intensities and different excitation wavelengths. The excitation wavelength varied from about 300 nm to about 460 nm. The PL intensity decreased as the excitation wavelength increased. The maximum emission intensity from the graphene quantum dots was achieved at about 420 nm when excited at 300 nm.

As a result, in the method of preparing graphene quantum dots of the present disclosure, a carbon-based layered structure and an intercalant were used to form an intercalation composite and uniform and high-quality graphene quantum dots were exfoliated and obtained from the intercalation composite. The preparation method uses water without an organic solvent or surfactant and thus is cost-effective and environmentally friendly. The potassium sodium tartrate hydrate served as a solvent for the solution process as well as an intercalant and a material for exfoliation of graphene quantum dots in the synthesis process. The synthesis process time was up to 14 hours and significantly reduced compared to the prior art. The graphene quantum dots prepared by the above-described preparation method were uniform in size and had a one- to three-layered circular shape with a diameter of 3.5 nm, and showed blue fluorescence under ultraviolet rays (365 nm).

From the above results, the graphene quantum dots prepared by the preparation method of the present disclosure can be mass-produced in uniform size with minimized defects and can be used in various fields such as electrodes, light emitting devices, sensors (temperature sensors or gas sensors), and solar cells. Also, according to the preparation method of the present disclosure, graphite nanoparticles having a size of several μm to several tens μm are used as a reactant, and, thus, graphene quantum dots can be produced in uniform size. Further, an intercalation composite is exfoliated by electrochemical exfoliation, and, thus, the production yield of high-quality graphene quantum dots can be improved.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF REFERENCE NUMERALS

100: Carbon-based layered structure
110: Intercalant
200: Intercalation composite
300: Graphene quantum dots

We claim:

1. A method of preparing graphene quantum dots, comprising:
    a process of introducing a carbon-based layered structure into a reactor containing a solvent;
    a process of forming an intercalation composite by inserting an intercalant between layers of the carbon-based layered structure;
    a process of placing and heat-treating the intercalation composite on a substrate to weaken the interlayer attractive force of the intercalation composite; and
    a process of exfoliating the intercalation composite by applying a voltage to the substrate to obtain graphene quantum dots.

2. The method of preparing graphene quantum dots of claim 1, wherein the carbon-based layered structure and the intercalant have a weight ratio of 10:90.

3. The method of preparing graphene quantum dots of claim 1, wherein the solvent includes NMP (N-methyl-2-pyrrolidinone), DMF (N,N-dimethylformamide) or diacetone alcohol.

4. The method of preparing graphene quantum dots of claim 1, wherein the carbon-based layered structure includes graphite nanoparticles, graphene nanoparticles or graphene oxide nanoparticles.

5. The method of preparing graphene quantum dots of claim 1, wherein the intercalant includes an alkali metal salt or an alkaline earth metal salt.

6. The method of preparing graphene quantum dots of claim 1, wherein the substrate is aluminum foil, copper foil or graphite foil.

7. The method of preparing graphene quantum dots of claim 1, further comprising:
    a process of performing ultrasonication on the composite.

* * * * *